Nov. 6, 1951 H. B. SOULE ET AL 2,574,301
AUTOMATIC SPEED AND FEED CHANGE
MECHANISM FOR MACHINE TOOLS
Filed March 31, 1948 5 Sheets-Sheet 4

Fig. 6.

Inventors
HAROLD B. SOULE
GORDON WILLIAM SMITHSON

Attorney

Fig. 7

Patented Nov. 6, 1951

2,574,301

UNITED STATES PATENT OFFICE 2,574,301

AUTOMATIC SPEED AND FEED CHANGE MECHANISM FOR MACHINE TOOLS

Harold B. Soule, Barrington, and Gordon W. Smithson, Pawtucket, R. I., assignors to Niles-Bement-Pond Company, West Hartford, Conn., a corporation of New Jersey Application March 31, 1948, Serial No. 18,126

2 Claims. (Cl. 74—335)

This invention relates to machine tools having shipping mechanism and more particularly relates to automatic turret lathes having speed and feed shipping mechanism; the invention relating more specifically to the control of the shipping mechanism and to control means whereby an adjusting member of suitable mechanism, such as change-feed-mechanism, may be operated to establish different speed settings of the mechanism.

A principal object of this invention is to provide a machine tool, and particularly an automatic turret lathe, having a construction which is simplified and reduced in cost and maintenance, having a reduced number of parts, requiring minimum replacement of parts due to wear, and at the same time having greater operational efficiency, being smoother, more positive and quicker in its movements and with reduced lost motion and shock, wear and strain on the parts.

Another object of this invention is to provide a machine tool having change-feed-mechanism and provided with simple, sturdy, durable, efficient and quick acting control means for controlling the speed settings of the change-feed-mechanism, said control means requiring relatively few parts and being adapted to be assembled and installed easily and quickly, is not apt to get out of adjustment and requires minimum replacement of parts due to wear, the control means being well suited for automatic operation to control the speed setting adjustments of the change-feed-mechanism quickly, smoothly, positively and efficiently.

Other objects of this invention will be in part obvious and in part pointed out hereinafter.

This invention may be said to be an improvement on the machine tool and automatic control means for the change-speed and feed mechanism thereof disclosed in the prior Patent No. 2,357,396, issued September 4, 1944, the improvement flowing in considerable part from the different construction and different arrangement and functioning of the control means for the change-feed-mechanism and in placing the shipping means of the change-speed-mechanism immediately adjacent the latter, thereby reducing parts and linkage resulting in quicker and more satisfactory shipping operations.

Reference being had to said patent and particularly to the change-feed-mechanism disclosed therein, the shipping mechanism shown in Fig. 5 thereof is replaced by the present invention with a single piston reciprocable into any one of three predetermined positions in an air cylinder and is connected to the throw lever of a three way clutch of the change-feed-mechanism in such a way that the clutch will be adjusted to establish a different speed setting adjustment of the change-feed-mechanism corresponding to each of the three different positions of the piston relatively to the cylinder; and electro-pneumatic means are provided for setting the piston in any one of the said three positions as desired. Also in accordance with this invention there may be other separate pistons shiftable electro-pneumatically into either of two predetermined positions in their cylinders, each piston having a rod which is separately connected directly to the throw lever of a separate clutch. These constructions and arrangements of parts eliminate the more complicated and delicate constructions and arrangements disclosed in said patent for adjusting the throw levers of the clutches of the change speed mechanisms, and serve to render the entire machine tool more simple and economical in construction, and maintenance and more efficient in operation as well as yielding other improvements and advantages which are readily apparent.

Accordingly this invention consists in the features of construction, combinations of elements and arrangements of parts set forth in the following description and the scope of the application of which will be indicated in the claims that follow.

In order that a clearer understanding of this invention may be had, attention is hereby directed to the accompanying drawings, forming a part of this application and illustrating certain possible embodiments of this invention, and in which:

Figure 1 is a schematic view of a clutch adjusting control organization embodying this invention, certain parts of the organization being shown in section;

Figure 2 is a sectional view of the piston and switch assembly shown at the lower right of Fig. 1;

Figure 3 is a sectional view of one of the electro-pneumatic valves of the control organization;

Figures 4, 5 and 6 show one way the control organization may be installed on an automatic turret lathe, and in these figures, Figs. 4 and 5, when read together (side by side), show a rear elevation of an automatic turret lathe equipped with the control means of this invention, certain concealed parts being shown in dash lines and a cover plate of the head stock transmission being removed to expose the elements of this transmission.

Similar reference characters refer to similar parts throughout the several views of the drawings.

Figures 1, 2, 3, 4:
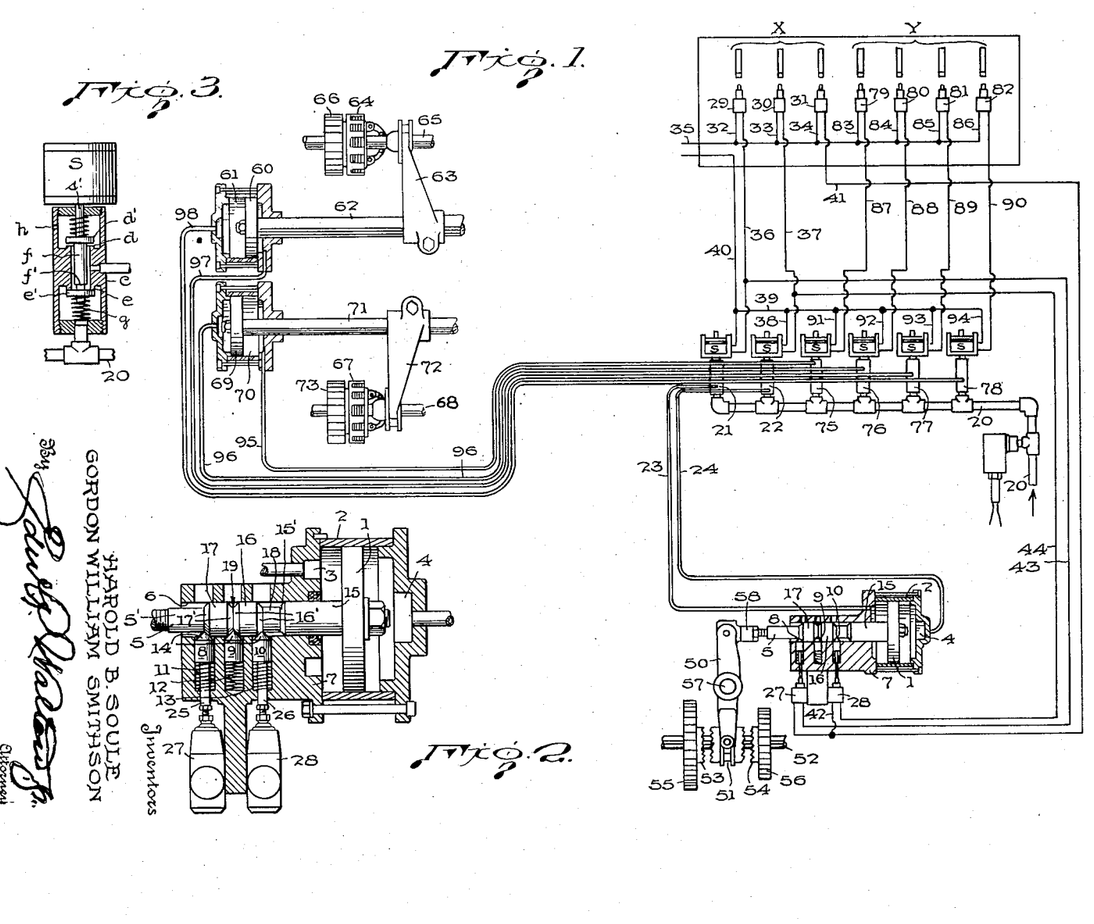
Figure 4:
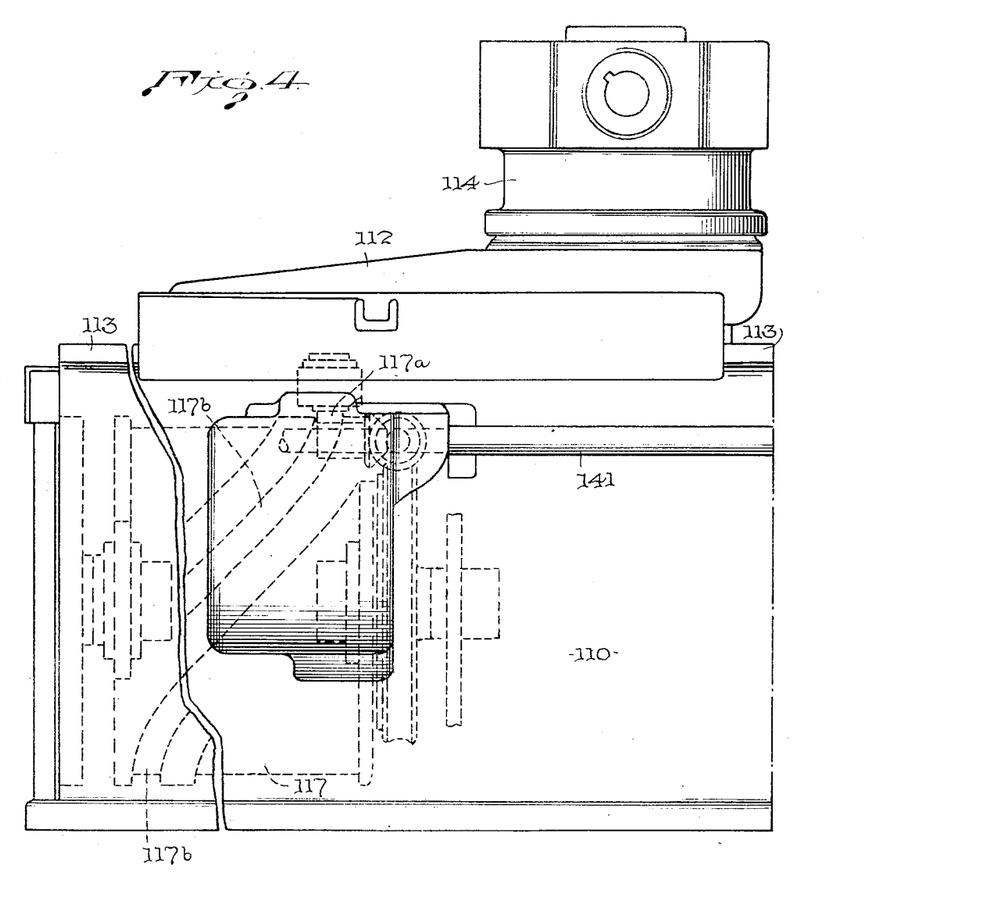

Referring to the drawings, and especially to Figs. 1, 2 and 3, which relate most specifically to the control system and means for controlling the setting of the change-feed-mechanism of the machine tool illustrated in the drawings, the control system or control means shown includes as one feature thereof a piston 1 reciprocable in an air cylinder 2 provided with air openings 3 and 4 entering the cylinder at the front and rear respectively. The piston has a rod portion 5 which extends through a bearing bore 6 therefor in a block 7 secured to the front of the cylinder and is reciprocable therein. Three detent plugs 8, 9 and 10 are mounted in line in recesses formed in the block 7 and are biased by springs 11, 12 and 13 disposed respectively between each plug and the bottom of its recess to urge the conical top ends 14 of the plugs to project into the bore 6. The rod 5 has three portions, 15, 16 and 17, of a diameter substantially the same as the diameter of the bore 6, the portion 15 being toward the head of the piston 1. Between the portions 15 and 16 the rod has a peripheral recess or groove 18 of some width and between the portions 16 and 17 the rod has a peripheral groove 19 of lesser width, and the outer end of the rod is of reduced diameter as at 5. The side walls 16' and 17' of the portions 16 and 17 and the side wall 15' of portion 15 adjacent the recess 18 are beveled so that whenever one of these beveled walls moves across the projecting head of one of the plugs 8, 9 or 10 in rising direction the wall will depress the plug and, whenever one of these walls moves across a plug in the opposite direction, the spring, which is biasing the plug, will project the plug into the arriving recess. The larger rod portions 15, 16 and 17 and the recesses and the plugs 8, 9 and 10 are so disposed longitudinally along the rod 5 that, when the head of the piston 1 is at the extreme rear end of its stroke in the cylinder, the larger portion 16 will be opposite and depressing plug 10 and the larger portion 17 will be opposite and depressing the center plug 9 and the reduced end of the rod will be opposite plug 8 and this plug is not depressed; and, when the piston head is in its extreme forward end of its stroke in the cylinder, the portions 16 and 17 will be respectively opposite and depressing plugs 8 and 9 and the plug 10 will extend into recess 18 and is not depressed; and, when the piston head is in a mid-position of its stroke, plug 8 will be on one side of rod portion 17, plug 9 will be between rod portions 17 and 16 and plug 10 will extend into recess 18 and no plug is in depressed position.

Pneumatic means are provided to shift the piston in its cylinder and therewith the rod 5 in the block 7 and relatively to the plugs 8, 9 and 10; and electrical means are provided to control the action of the pneumatic means.

The pneumatic means include a main air conduit 20 connected to a source (not shown) of compressed air maintained at a suitable pressure; 50 pounds pressure or thereabouts being suggested when the change speed mechanism of an automatic turret lathe is involved. Conduit 20 conducts air for shifting the position of piston 1 to two separate solenoid operated valves, 21 and 22. An air duct 23 leads from valve 21 into the front air aperture 3 in cylinder 2 and an air duct 24 leads into the rear air aperture in the cylinder.

Each of these valves 21, 22 comprises an elongated casing c having an opening in their lower end which receive a threaded nipple on the main air supply line 20. The interior of the valve casing c is divided by a partition having a bore therein longitudinally of the casing and at the ends of the bore are provided valve seats d and e. A plunger f reciprocates in said bore and has a valve d' thereon to cooperate with the seat d and has on its other end a valve e' slidable thereon and normally held against the seat e by a spring g, the valve e' being opened by the plunger f when the shoulder f' contacts in its downward movement the valve e' and opens it against pressure of the spring g. There is an exhaust port h in the side of the casing above the valve d'. The solenoid s is mounted on the top of the valve and the plunger s' thereof depresses the plunger f when the solenoid is energized and raises it to full line position when the solenoid is de-energized.

Each of the plugs 8 and 10 has a stem or tail portion 25, 26 extending through a bore in the block 7 and protrudes therefrom and there engages an operating element, such as a push button or throw lever of an electric switch 27, 28, each of these switches being adapted to close the circuit through it when the plug is depressed and to break the circuit when the plug is not depressed. There are also three other similar switches, 29, 30 and 31 in some suitable location and each is adapted to be closed and opened manually or by suitable automatic mechanism which is indicated merely in a token manner at X in Fig. 1. Conductors 32, 33 and 34 connect one pole of switches 29, 30 and 31 to one line 35 of a source of current supply (not shown). Conductors 36 and 37 lead respectively from the other poles of switches 29 and 30 to the solenoids of valves 21 and 22 and suitable conductors 38, 39, 40 lead from the other sides of these solenoids to the other side of the main current line. From the other pole of switch 31 a conductor 41 leads to one pole of switch 27 and has a branch 42 going to one pole of switch 28. A conductor 43 leads from the other pole of switch 27 to the conductor 36 which connects switch 29 with the solenoid of valve 21, and a conductor 44 connects the other pole of switch 28 with conductor 37 which connects switch 30 with the solenoid of valve 22.

For the purpose of giving an indication of one way the electro-pneumatic control means just described may be used, there is shown in Fig. 1, and merely as an example and quite diagrammatically, the rod 5 connected to one end of a clutch shifting lever 50 of a three way clutch comprising a clutching member 51 slidably keyed to a shaft 52, the clutching member having clutch teeth on opposite sides adapted to mesh respectively with complementary toothed members 53 and 54 carried respectively on gears 55 and 56 which are rotatably mounted on shaft 52. Clutch shifting lever 50 is pivoted intermediate its ends, as at 57, its lower end having a yoke engaging the clutching member 51 and its upper end being connected to rod 5 by an adjustable connection 58 whereby they may be so related that, when the piston is at the rear of its cylinder, the clutching member 51 will clutch the toothed member 53 on gear 55 and, when the piston is at the front of the cylinder, the clutching member will clutch the toothed member 54 of gear 56 and, when the piston is in its intermediate position in the cylinder, the clutching member will not clutch either of the members 53 or 54 and the clutch will be in mid-position adjustment. It is comtemplated that shaft 52, gears 55 and 56 and the three way clutch are elements of a change-feed-mechanism capable of three different speed adjustments, one when gear 55 is engaged, another when gear 56 is engaged and a third when the clutch is in midway adjustment. Specifically shaft 52, gears 55 and 56 and the three way clutch are elements of the change-feed-transmission of the machine tool shown in the drawings, but obviously, instead of connecting the piston 1 to the shift lever of a three way clutch, the piston may be similarly connected to the operating element of a three way electric switch or to the operating element of a three way pneumatic or hydraulic valve to control the setting of such element into any one of three different operating positions and to set the switch or the valve accordingly.

The control means shown in Fig. 1, also includes a piston 60 reciprocable in an air cylinder 61 and having a piston rod 62 attached directly to the shifting arm 63 of a clutch 64, the arm 63 engaging the shifting element of the clutch and which is slidably keyed to a drive shaft 65 of the change-speed-mechanism and is engageable with and disengageable from a gear 66 rotatably mounted on shaft 65, whereby when the piston is at the front of the cylinder (as shown) the clutch is disengaged and the gear 66 not rotated by shaft 65 and when the piston is at the rear of the cylinder the clutch is engaged and the shaft 65 drives the gear 66.

A similar clutch 67 is mounted on another shaft 68 of the change-speed-mechanism and a similar piston 69 working in cylinder 70 has a similar piston rod 71 directly attached to the shift lever 72 of this other clutch and whereby when the piston is at the front of its cylinder the clutch is disconnected and the gear 73 which is rotatable on the shaft is not rotated thereby and when the piston is at the rear of the cylinder (as shown) the clutch connects gear 73 to shaft 68 so as to be driven thereby.

Also as shown in Fig. 1, electro-pneumatic means are provided for selectively setting the pistons 60 and 69 in either of their front or rear positions in their cylinders and consequently adjusting the clutches 64 and 67 accordingly. Such means, as shown, include four separate electro-pneumatic valves 75, 76, 77 and 78 each one like the valve shown in Fig. 3, and four electric switches, 79, 80, 81 and 82, one for the solenoid of each valve separately. One side of each switch is separately connected by a conductor, such as 83, 84, 85 and 86 to the line 35 of the source of current supply, and conductors 87, 88, 89 and 90 connect the other sides of the respective switches to one side of the respective solenoids of valves 75, 76, 77 and 78. The other sides of the solenoids are connected respectively by conductors 91, 92, 93 and 94 to the conductor 40 which leads to the other line of the source of current supply. Each of valves 75, 76, 77 and 78 is connected to the air pressure conduit 20 which receives air under pressure from a suitable source, and each valve has an exhaust port as shown in Fig. 3. An air conduit 95 leads from valve 75 into the front of cylinder 70; an air conduit 96 leads from valve 76 into the rear of cylinder 70; an air conduit 97 from valve 77 leads into the front of cylinder 61; and an air duct 98, leads from valve 78 into the rear of cylinder 61. The four switches are adapted to be opened and closed automatically by suitable means which are indicated in token manner at Y in Fig. 1. It is contemplated that shafts 65 and 68, gears 66 and 73 and clutches 64 and 67 comprise elements of a change speed transmission mechanism capable of four different speed adjustments, one when neither clutch is engaged, one when clutch 64 is engaged and clutch 67 disengaged, a third when clutch 67 is engaged and clutch 64 disengaged and a fourth speed adjustment when both clutches are engaged.

To more clearly understand one possible construction of an improved machine tool embodying the control features described above there is shown in Figs. 4, 5 and 6, an improved automatic turret lathe having such control. As shown, the machine tool generally has the following component parts—a base or bed 110 which comprises a hollow casting having on one end a head stock 111 and having mounted on the top of the base a turret slide or carriage 112 which reciprocates on ways 113 to and fro longitudinally of the base relatively to the head stock; an indexible turret 114 mounted on the slide or carriage 112 and cross slides arranged on the base between the head stock and the turret slide to move transversely of the base. The cross slides, last mentioned, are not illustrated in the present disclosure as their inclusion has no particular relation to the subject matter of the present invention, but reference may be had to United States Patent No. 1,881,928, where said cross slides are shown at 100 and the means for actuating them from the feed shaft, which also actuates the turret slide, is illustrated and described. The spindle 115 may have a chuck, work fixture or other work-holding device (not shown), affixed to the end thereof opposite the turret 114 as is well understood in the art. The spindle 115 is driven from a constant speed shaft 65 through intermediate shafts and clutches which provide for changes in speed through automatic control and through a direct connection between the spindle 115 and the cam drum 117, which operates the turret slide, a feed is provided which is always relative to the spindle revolutions. The constant speed shaft 65 is driven from a belt pulley or an electric motor 118 (as the case may be), and has rotatably mounted thereon a gear 66 and also has keyed thereon a gear 120. The gear 66 meshes with a gear 121 keyed on the intermediate shaft 122 and the gear 120 meshes with an overrunning gear 123 (otherwise known as a three-roller gear) keyed on the shaft 122, which latter also has keyed thereon a pinion gear 124. The gear 121 on intermediate shaft 122 meshes with a gear 73 rotatably mounted on an intermediate shaft 68 while the pinion gear 124 on shaft 122 meshes with an overrunning gear 127 keyed on shaft 68. Keyed on an end of the shaft 68, extending exteriorly of the spindle transmission casing 111, is a gear 128 which meshes with a gear 129 similarly mounted and keyed on an end of an intermediate shaft 130 which also has a pinion gear 131 keyed thereon and meshing with the gear 132 surrounding and keyed on the spindle 115. The gears 128 and 129 are hand-pick-off gears (otherwise known as "hand change gears") which allow for a full range of the spindle speeds within the capacity of the machine according to the selection of hand change gears that is made to meet particular requirements. On constant speed drive shaft 65 is mounted also a friction clutch 64 whose fixed part is fastened to or part of the gear 66 and whose slidable part or cone is keyed to the shaft 65. Likewise on shaft 68 is mounted a similar friction clutch 67 whose fixed part is fastened to or part of the gear 73 and whose slidable part of cone is keyed to the shaft 68.

Thus, it will be seen that four different speed changes may be effected automatically for driving the spindle from the source of power 118— (1) by disengaging of both clutches 64 and 67; (2) by engaging only clutch 64; (3) by engaging only clutch 67; (4) by engaging both clutch 64 and 67.

Figure 5:
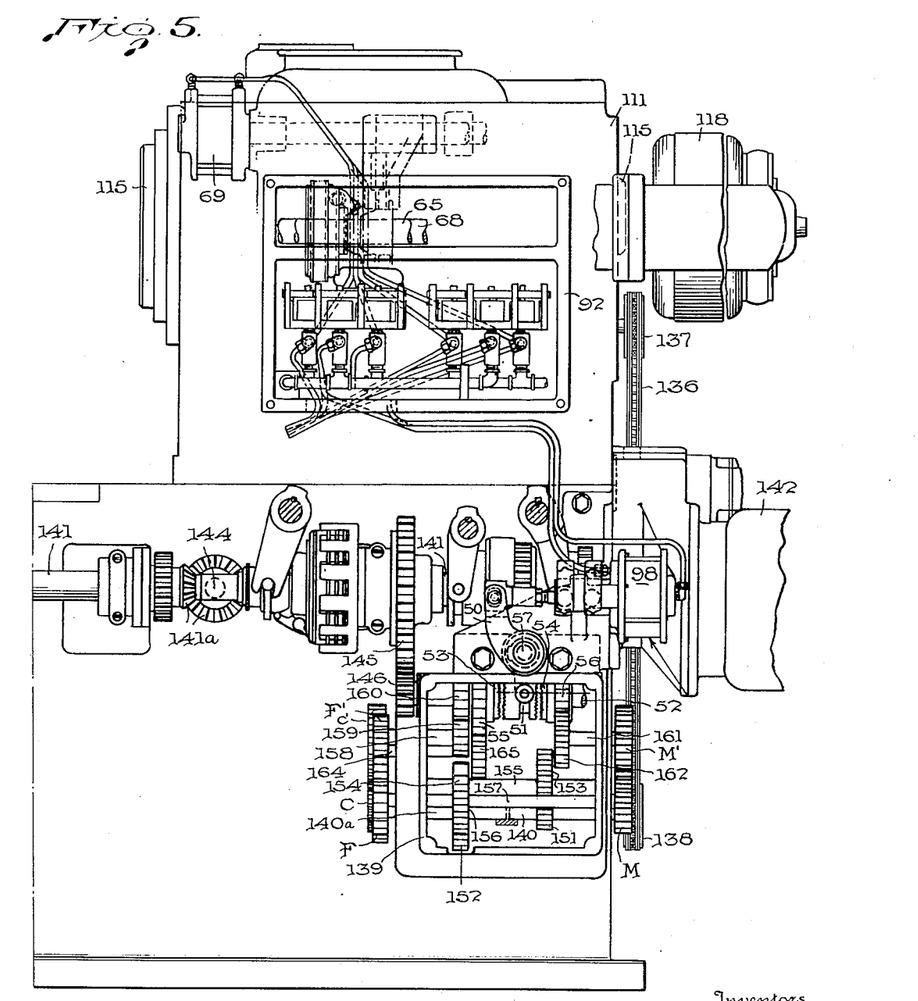
Figure 6:
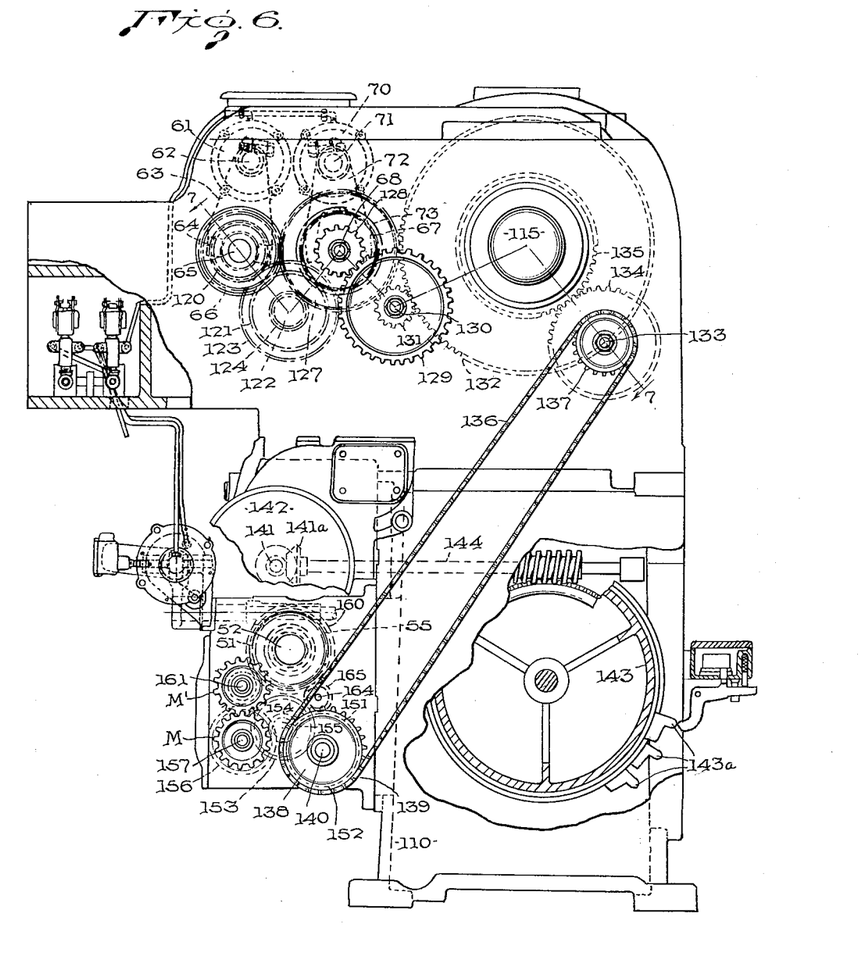
Fig. 6 is an end view of the lathe looking toward the head stock end, certain parts being shown broken away and other parts being shown in dotted lines to more clearly show the construction.
Figure 7:
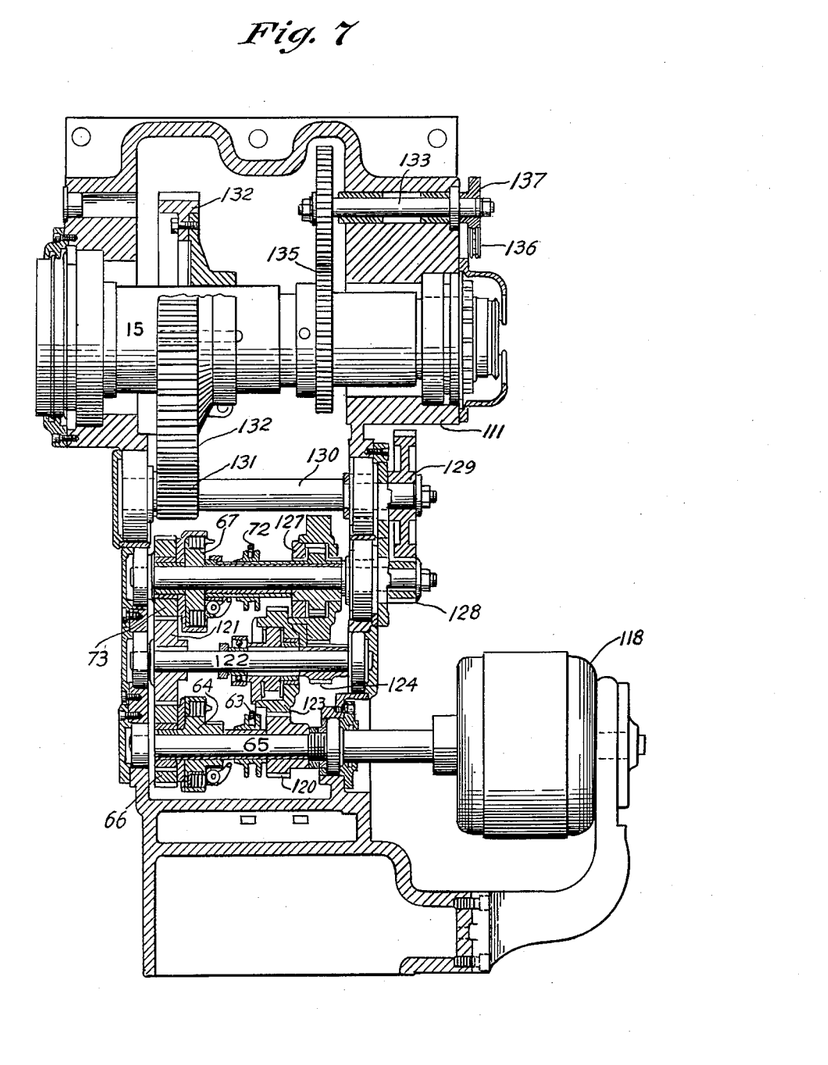
Figure 7 is a developed sectional view of the spindle power transmission means when taken substantially on line 7—7 of Fig. 6 and looking in the direction of the arrows.

In the headstock 111, a take-off shaft 133 (Figs. 6 and 7) is journalled and has a gear 134 fast thereon and meshing with a gear 135 on the spindle 115. From this shaft 133 power is taken to drive the feed mechanism which actuates the turret slide 112 (as well as the cross-slides not shown) during cutting operations of the tools carried by said slides. This power is transmitted through a sprocket chain 136 trained over sprocket wheel 137 fast on shaft 133 and over sprocket wheel 138 fast on shaft 140 journalled in transmission feed-box 139 carried at the side of the base 110 below the headstock 111 (Figs. 5 and 6).

The mechanism contained in feed-box 139 provides automatically three changes in speed of the feed-shaft 141, which is driven therefrom. The feed-shaft 141 drives cam drum 117, through suitable gear connections not shown, and a cam follower 117a on the turret slide extends into the cam path 117b of the cam drum, thereby causing the turret slide to be reciprocated to and fro, relatively to the spindle 115, on its ways 113. Taking off from feed shaft 141 through a bevel gear connection 141a is a worm shaft 144 which meshes with a gear on a switch actuating dog drum 143 to rotate it.

Respecting the feed box 139, the shaft 140 may be a divided shaft and has keyed to it pinions 151 and gear 152, which, respectively, mesh with gear 153 and pinion 154 both keyed on an intermediate shaft 155. Pinion 154 meshes with a gear 156 keyed to countershaft 157. The ends of shaft 157 extend through the feed box, one end having keyed thereto a gear F which meshes with a gear F' on stub shaft 158 which also has keyed to its other end a pinion 159 meshing with an overrunning gear 160 keyed on the shaft 52. The other end of the shaft 157 has keyed thereto a gear M meshing with a gear M' keyed on the stub shaft 161, which also has keyed to its inner end a gear 162 meshing with gear 56 rotatable on shaft 52. In like manner, the other extending end of the shaft 140 has keyed to it gear C meshing with gear C' keyed on stub shaft 164, which latter has keyed to it a gear 165 meshing with gear 55 rotatable on shaft 52. The gears C and C' are hand change gears for coarse feed, the gears M and M' are hand change gears for medium feed and the gears F and F' are hand change gears for fine feed. A clutch 51 is interposed between the gears 56 and 55, as shown particularly in Figs. 1 and 5, to connect either of them to the shaft 52 or, when in mid-way position, to disconnect both of them. This clutch may be of any suitable type, but is here shown as of the tooth type, comprising a slidable clutching member keyed on the shaft 52, and the opposing hub faces of these gears 56 and 55 being provided with complemental clutching surfaces 53 and 54. Therefore, when the shaft 140 is driven and the clutch is in mid-way position, the feed-box mechanism is in fine feed and the drive is from pinion 151, gear 153, shaft 155, pinion 154, gear 156, hand change gears F and F', pinion 159 to the overrunning gear 160 which drives shaft 52, pinion 146 and overrunning gear 145 on the feed shaft 141. When the clutch 51 is engaged with the gear 56, the mechanism is in medium feed and the drive is from shaft 140, pinion 151, gear 153, shaft 155, pinion 154, gear 156, shaft 157, hand change gears M and M', shaft 161, gear 162, gear 56, clutch 51, shaft 52, pinion 146 and overrunning gear 145 on feed shaft 141. When the clutch 51 is engaged with the gear 55, the mechanism is in coarse feed and the drive is from shaft 140, pinion 151, gear 153, shaft 155, pinion 154, gear 152, shaft 140a, hand change gears C and C', shaft 164, gear 165, gear 55, clutch 51, shaft 52, pinion 146 and overrunning gear 145 on feed shaft 141. When the shaft 52 is being driven from either the gears 56 or 55, it will overrun the gear 160. The shaft 140 may be solid throughout, instead of divided as shown, in which case gear 152 is eliminated.

The yoke members 63 and 72 which actuate the sliding parts respectively of the clutches 64 and 67 are each operated by the piston 60 in its cylinder 61 and the piston 69 in its cylinder 70, respectively, which are disposed to the rear of the headstock end of the machine and supported from the feed box 39, the pistons having rods 62 and 71 connected directly to the yoke members 64 and 72.

The above description explains those portions of an automatic turret lathe to which the present invention is concerned—that is, it is the operation of the two clutches 64 and 67 in the headstock unit 111 and the clutch 51 in the feedbox unit 139 under the automatic control of dogs 143a adjustably and selectively mounted on the dog drum 143 which makes one revolution for each cycle of operation of the machine. A cycle of operation of the machine embraces its operation where the turret slide has reciprocated back and forth relative to the spindle a number of times corresponding to the number of faces on the turret or to the number of faces which have been brought to index position for the tools thereon to perform work on a given subject-workpiece. The operation of these clutches is attained, to accomplish the objects of the invention, by an electro-pneumatic mechanism schematically shown in Figure 1, and it is obvious that the clutches 51, 64 and 67 may be caused to be placed in selected adjustment and in selected timing relatively to each other by merely properly adjusting the control switches in the proper sequence; and that such adjustments of the switches may be effected either manually or by suitable automatic means, an example of the latter being shown associated with the automatic turret lathe described herein and illustrated in the drawings.

In order to better understand the operation of the machine tool and the automatic control of the speed and feed shipping mechanism an example of one possible operation of the machine will now be given as one illustration of the operations at specific speeds. Accordingly, assume a machine set up requiring spindle speeds of 16, 28, 54, and 93 R. P. M. of the spindle, and assume that in combination with those speed changes turret and cross slide feeds of .009", .034" and .165", per spindle revolution are required. First the proper sets of hand change gears are put in place. To secure a spindle speed of 16 R. P. M. the headstock friction clutches 64 and 67 are both disengaged. To change the speed of the spindle from 16 to 28 R. P. M. it is necessary to cause the friction clutch 64 on the main drive shaft 65 to be engaged. To engage the friction clutch 64, a dog is applied to the dog drum which will cause the switch 81 to energize the solenoid in the valve 77, which in turn opens the air supply under pressure to the right hand side of the air cylinder 61. As the air under pressure enters the air cylinder 61, it will cause the piston to travel the full distance to the left hand side of the air cylinder, which will result in the engagement of the friction clutch 64 with gear 66.

To still further increase the speed of the spindle from 28 to 54 R. P. M. we must first disengage the friction clutch 64 on the main drive shaft and then engage the friction clutch 67 on headstock shaft 68. The operation described is accomplished by the application of two dogs to the dog drum, one of which will establish contact with the switch 82, which will energize the solenoid in the valve 78, admitting air under pressure to the left hand side of the air cylinder 61, thereby disengaging the friction clutch 64 on the headstock main drive shaft 65. As we must now engage the friction clutch 67 on headstock shaft number 68, another dog is attached to the dog drum, contacting switch 79 and energizing the solenoid in valve 75. The valve 75 will admit air under pressure on the right side of the piston in the air cylinder 70, causing that piston to travel to the extreme left and engage gear 73.

As it is now desired to still further increase the speed of the spindle to 93 R. P. M. both friction clutches 64 and 67 in the headstock must be engaged. As the friction clutch 67 on headstock shaft 68 is already engaged it is only necessary to apply one dog to the dog drum which will establish a contact in the switch 85 energizing the solenoid in the valve 77, which will induce a flow of air under pressure on the right hand side of the air cylinder 61, which will cause a travel of the piston in the cylinder to the extreme left, establishing the engagement of the friction cluch 64, in combination with the friction clutch 67 already engaged.

The three feed changes, previously listed as an example, namely .009", .034" and .165", are obtained by three positions of the feed clutch 51. The fine feed is secured by allowing that feed clutch to remain in mid-way position. The medium feed or .034" is secured by shifting the feed clutch 51 to the left hand. The course feed, or .165" is secured by shifting the feed clutch 51 to the right. For the purpose of citing this example of automatic shifting of the feeds enumerated, consider the machine to be feeding at the .009" rate per spindle revolution. As the piston in the feed clutch operating air cylinder 2 is in its mid-way position, and it is desired to make a change from .009" to .034" per revolution of the spindle, as previously stated, the feed clutch 51 must be shifted to the left. As the bell crank acting as a clutch shift lever is fulcrumed in the center the piston 1 in the air cylinder 2 must be shifted to the extreme right by applying a dog to the dog drum, which will contact the switch 29, energizing the solenoid in the valve 21, and causing air to enter the left hand side of the air cylinder 2. To reverse the feed clutch 51 to the extreme right hand engagement, which will produce a change in feed from .034" to .165", a dog must be attached to the dog drum contacting the switch 30, which will energize the solenoid in the valve 22, allowing the air under pressure to enter the right hand side of the air cylinder 2, throwing the piston to the extreme left hand side of the air cylinder 2. The machine has now reached the end of its cycle with the piston in the air cylinder 2, at the extreme end of its stroke to the left.

To prepare the machine for the beginning of a new cycle, starting once again with a feed of .009" per spindle revolution, the piston in air cylinder 2 must be returned to its central position in the cylinder bore. To accomplish that movement of the piston, thereby restoring the feed clutch 51 to its mid-way position, a dog is attached to the dog drum, which will establish a contact at the switch 31. Thus the current is able to pass through the switch 27, previously closed by the action of the piston rod operated by the air cylinder 2, and thence to solenoid of valve 21, thereby directing air under pressure to the left hand side of the cylinder 2. The piston in the air cylinder is thus forced to the right until it reaches its midway position. The spring plunger 8 operating the switch 27 has held that switch in a closed position during the passage of the piston from the extreme left to its midway position in the cylinder 2. As the piston reaches the fore mentioned position, the spring plunger 8 connected with the switch 27, drops back on to the smaller diameter of the piston rod, thereby breaking the circuit, and de-energizing the solenoid valve 21. The supply of air under pressure is thus cut off from the air cylinder 2 preventing further movement of the piston. If the cycle of the machine had been completed leaving the piston in the air cylinder 2 at the extreme right, instead of the extreme left, the piston could have been returned to its central position in the same manner as we have described in the sentences directly preceding, through the medium of the same switch 31 used in conjunction with the switch 28 and the solenoid valve 22.

Obviously other speeds and other relative feeds may be had by using appropriate sets of hand change gears. Also as previously stated, the changes may be under the manual control of the operator instead of automatic; and, of course, mechanisms other than the specific mechanism illustrated and described for the automatic control of the machine may be employed. Also, as previously stated, the clutch adjusting and setting control means may be applied to operating members of electric switches and pneumatic and hydraulic valves, or other devices, instead of specifically to shift levers of mechanical clutches.

From the above it will be seen that the objects of the invention have been attained and that the change speed and feed mechanism requiring instantaneous movement is actuated effectually with a greatly reduced number of parts and at substantially less cost.

Having thus described the invention and the manner in which the same is to be performed, it is understood that certain changes may be made in the precise construction shown and described which fall within the terms of the appended claims.

That which is claimed as new is:

1. In an automatic turret lathe, the combination of a spindle and a co-operating turret-slide movable to and fro relative to the spindle; means for acutating said slide including a change-feed-mechanism; pneumatically operated means to set the change-feed-mechanism in various selected feed positions; said pneumatically operated means comprising a cylinder and a piston reciprocable therein and operatively connected to said change-feed mechanism, a source of air-pressure supply connected to said cylinder on opposite sides of said piston to reciprocate said piston from one extreme position to the other extreme position, an air valve in each air connection to said cylinder for controlling the air supply to each side of said piston, solenoids for actuating each valve respectively, an electric circuit for each solenoid including a control switch therein; a control dog-drum driven by the slide actuating means and including pre-settable dogs thereon to selectively close and release said control switches to energize and deenergize said solenoids for opening and closing said valves selectively; two conditioning switches arranged to be actuated by the opposite movements of said piston to alternately open and close said conditioning switches when said piston is moved in either direction from either of its extreme positions to the other extreme position, and both conditioning switches being released to open, when said piston is moved into an intermediate position, each of said conditioning switches being electrically connected respectively to one of said solenoids controlling air supply for moving the piston toward its other extreme position and shunting said control switches; and another control switch positioned to be selectively actuated by a dog on said drum for closing electrical current supply to said conditioning switches for energizing the solenoid connected to the closed conditioning switch to apply air pressure to move said piston toward its other extreme position until said last mentioned conditioning switch is opened at said intermediate position of said piston, whereby said piston is actuated through said dog drum at pre-determined times in the operation of the machine from one extreme position to the other without stopping at an intermediate position or from either extreme position to an intermediate position, or vice versa, to automatically and preselectably shift and change-feed mechanism to change-feed positions.

2. An automatic turret lathe as set forth in claim 1 wherein the piston has a piston rod and wherein said conditioning switches are normally biased to open and arranged in spaced relation along the length of said piston rod, an enlargement formed on the piston rod and arranged to disengage said conditioning switches when the piston is in an intermediate position, thus allowing the switches to open, and to engage only one of said conditioning switches at a time to close the same, when the piston is moved in either direction beyond said intermediate position while disengaging the other of said conditioning switches.

HAROLD B. SOULE.
GORDON W. SMITHSON.

REFERENCES CITED

The following references are of record in the file of this patent:

UNITED STATES PATENTS

| Number | Name | Date |
|---|---|---|
| 2,220,996 | Feigel | Nov. 12, 1940 |
| 2,234,463 | Brewer | Mar. 11, 1941 |
| 2,244,092 | Wheeler | June 3, 1941 |
| 2,357,396 | Fuller | Sept. 5, 1944 |
| 2,360,976 | Peterson | Oct. 24, 1944 |